UNITED STATES PATENT OFFICE.

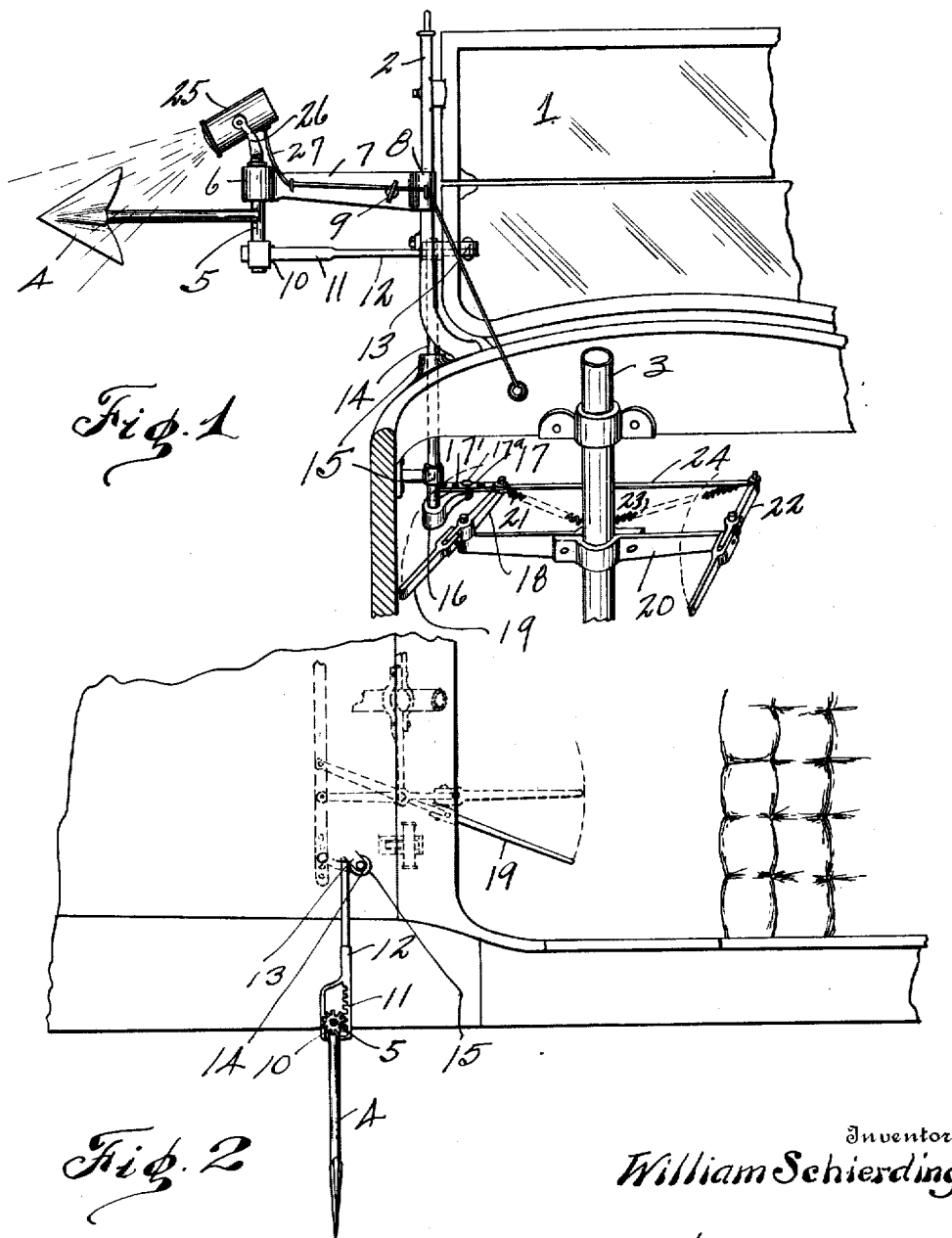

WILLIAM SCHIERDING, OF SPOKANE, WASHINGTON.

AUTOMOBILE-SIGNAL.

1,336,588.  Specification of Letters Patent.  Patented Apr. 13, 1920.

Application filed May 19, 1919. Serial No. 298,252.

*To all whom it may concern:*

Be it known that I, WILLIAM SCHIERDING, a citizen of Germany, (first and second papers being taken out to become a citizen of the United States), residing at Spokane, in the county of Spokane and State of Washington, have invented certain new and useful Improvements in Automobile-Signals, of which the following is a specification.

The present invention relates to improvements in automobile signals and is designed for the purpose of providing a traffic signal for use on the front of the automobile, preferably supported from the windshield or windshield post. The invention contemplates a device of this character which may be operated and brought to a conspicuous position, when required to indicate a turn or stop, and which is effective, both by daylight and at night in performing its required functions in an accurate and reliable manner.

Preferably the device is operated by the driver of the car or automobile, who employs his knee or knees for actuating the operative connections whereby the signal is brought to operative position.

The invention consists essentially in certain novel combinations and arrangements of parts whereby a swiveled arm, in the formation of an arrow, which is supported to turn, preferably on the windshield post, may be turned or swung out to operative position for daylight use, and this same arm and operation are used at night in connection with a spot light or head light which illuminates the signal arm.

In the accompanying drawings one complete example of the physical embodiment of the invention is illustrated, the parts being combined and arranged according to the best mode I have so far devised for the practical application of the principles of the invention.

Figure 1 is a view in elevation, of a left hand drive car, or so much thereof as necessary to illustrate the applicability of the invention which is shown with the indicator arm or signal arrow in operative position and the electric lamp illuminating the arrow as at night.

Fig. 2 is a top plan view of the parts in Fig. 1, the lamp and accessories, however, being omitted in the interest of convenience of illustration.

In the preferred form of the invention as illustrated in the drawings a left hand drive car is utilized for depicting the device and the windshield 1, its post 2 and the usual steering post 3 are utilized for the various required purposes.

Preferably the indicator or signal arm is in the form of an arrow 4, provided with a vertically arranged shaft 5 supported to swing horizontally in the bearing 6 of the bearing bracket 7 which has an attachment end formed in the shape of clamping jaws 8 adapted to clasp about the vertical windshield post 2, and these jaws are securely clamped on the post by means of the clamping screw or bolt 9. By the utilization of the clamping jaws and the set screw it will be apparent that the position of the indicator arm or signal arrow may be changed by sliding the bracket on the post to the desired position and then clamping the jaws on the post by means of the set screw, and in this manner the signal may be fixed in proper position to suit different conditions or tastes.

The arrow is adapted to swing horizontally toward and away from the car, the outward or extended position of course being the operative position, and to this end the arrow shaft is journaled with stability in the bearing bracket so that it may with facility be oscillated through the medium of the small pinion 10 fixed on the lowermost end of the shaft by the co-action therewith of the rack teeth 11 of the horizontal rack bar 12, the latter being adapted to reciprocate horizontally.

Directly connected by pivotal arrangement with the rack bar is a crank arm 13 fixed at the upper end of the vertically disposed crank shaft 14 which is journaled in bearings or bearing brackets 15 attached at suitable places on the car to support the shaft which, as shown, has its upper operating end outside the car and its lower actuating end inside the car under the housing. At its lower end the crank shaft has a fixed crank arm 16 to which is pivoted the link 17 fashioned with spaced pivot openings 17' one of which may be selected for the pivot bolt or pin 17ª which makes the proper connection between the crank arm and the link, and this link is the medium of connecting the crank shaft through its arm with the actuating lever 18 which extends longitudinally of the car and is provided with a foldable arm 19 as shown. The lever is located in position to be accessible for use by the knee of the driver and the mechanism is operated by outward pressure of the knee on the arm 19, as shown in the drawings. The actuating lever is supported on a double wing bracket 20, fixed to the post 3, and it will be apparent that the foldable arm 19 may be swung back out of operative position, when not required, as indicated by the dotted lines.

The arrow is held rigid in operative position, and excessive movement of the arrow is prevented by the locked condition of the rack bar, pinion and arrow shaft, as depicted in Fig. 2, and the crank shaft is held against accidental rotation by the spring 21 attached to the lever and to the bracket 20, and it will of course be apparent that the device is operated against the tension of this spring, and that the spring returns the parts of the device, including the signal arm, to inoperative position, when pressure is withdrawn from the actuating lever.

I have illustrated an additional lever 22 with its spring 23, and the two levers are connected by a link 24, that may be used under some conditions, the parts co-acting as is readily evident.

For use of the signal at night, I provide a spotlight 25 pivoted in the forks or yoke 26 positioned above the signal bracket, and provided with usual connections 27, in order that the lamp may be turned to direct its rays upon the signal arrow. The spot light may of course be used for other usual purposes.

From the above description taken in connection with my drawings it is apparent that I have provided a signal mechanism that fulfils the purpose of the invention and performs its functions in a comparatively perfect manner.

Having thus fully described my invention, what I claim is—

1. The combination with the windshield post and fixed bracket, of a signal arm having a vertically arranged shaft journaled to revolve therein, a yoke at the top of the shaft and an illuminating lamp pivoted in the yoke, a pinion on the lower end of the shaft, a rack bar engaging the pinion, a crank shaft and an arm thereon pivoted to the rack bar, a second crank arm and an actuating lever connected thereto.

2. The combination with the post and adjustable bracket thereon, and a shaft journaled in the bracket having an indicating arrow and an illuminating lamp therefor, of a pinion on the shaft, a rack bar engaging the pinion, a crank shaft having an arm pivoted to the rack bar, and a lower arm and adjustable pivoted link, an actuating lever pivoted to the link, and said lever having a foldable arm.

In testimony whereof I affix my signature.

WILLIAM SCHIERDING.